United States Patent [19]

Williams

[11] Patent Number: 4,723,719
[45] Date of Patent: Feb. 9, 1988

[54] INVERTIBLE/REVERSIBLE TOOL FOR USE IN A ROTARY FOOD PROCESSING APPLIANCE

[75] Inventor: James E. Williams, Stamford, Conn.

[73] Assignee: Cuisinarts, Inc., Greenwich, Conn.

[21] Appl. No.: 945,490

[22] Filed: Dec. 23, 1986

[51] Int. Cl.$^4$ .......................... B02C 18/24; B01F 7/00
[52] U.S. Cl. ................................ 241/282.2; 366/279; 366/330
[58] Field of Search .......................... 241/282.1, 282.2; 366/279, 330, 349, 245, 251

[56] References Cited

U.S. PATENT DOCUMENTS

| | | | |
|---|---|---|---|
| 3,368,800 | 2/1968 | Barnard, Jr. | 241/282.2 |
| 3,380,499 | 4/1968 | Vocci et al. | 241/282.1 X |
| 3,892,365 | 7/1975 | Verdun | 241/282.1 |
| 3,970,258 | 7/1976 | Mantelet | 241/282.1 |
| 4,487,509 | 12/1984 | Boyle | 366/279 X |

Primary Examiner—David Werner
Attorney, Agent, or Firm—Parmelee, Bollinger & Bramblett

[57] ABSTRACT

An invertible/reversible tool for use in a rotary food processing appliance is provided for performing predetermined processing operations in a first position and other predetermined operations in a second upside down position in a working bowl, which bowl contains a drive shaft for rotating the tool about a vertical axis in the bowl. The tool has an elongated hub with first and second sockets positioned on opposite ends adapted to engage the drive shaft for rotating the elongated hub in different directions depending on which socket is engaging the drive. Raised ridge keyways extending vertically for at least more than half the length of the elongated hub are provided to provide a positive driving relationship between the elongated hub and an encircling blade hub which carries reversible blades extending outwardly relative to the axis of rotation from opposite sides of the blade hub. This blade hub is slidable axially along the elongated hub so that the blade hub will freely slide down to the lower end of the elongated hub when the latter hub is inverted. The blades have first and second edges of differing characteristics which move in the same direction for performing first food processing operations and in a second direction for performing second food processing operations when the tool is turned upside down and coupled to the motor drive.

11 Claims, 7 Drawing Figures

INVERTIBLE/REVERSIBLE TOOL FOR USE IN A ROTARY FOOD PROCESSING APPLIANCE

BACKGROUND

This invention relates to an invertible/reversible tool for use in rotary food processing appliances and more particularly, to such a processing tool having reversible blades extending outwardly therefrom, which reversible blades perform one type of food processing operations in a first position and second types of food processing in an upside down position.

Electrical appliances for food processing have in many respects considerably changed the way food is prepared and have eliminated the drudgery involved in such manual food preparation steps as chopping, grinding, grating, slicing, mixing, etc. Such appliances generally have a working bowl with a motor driven tool drive means projecting into the bowl with which various selected rotary food processing tools can be engaged to be driven for performing various food processing operations in accordance with the desires of the user. The latest trend in this appliance field is to provide smaller appliances for convenience in chopping, grinding and grating smaller amounts of food. Various food processing operations often are characterized by requiring different types of tools to be engaged with the motor drive of the appliance in order to perform these various types of food processing functions. It would be desirable to have available a single tool equipped to perform a variety of food processing operations using the same rotary tool.

SUMMARY OF THE DISCLOSURE

Accordingly, it is an object of this invention to provide an invertible/reversible tool for performing different food processing operations when mounted in different positions to the motor drive of a food processing appliance.

A further object of this invention is to provide a new and improved reversible food processing tool which is simple in construction and easy to install and operate in a food processing appliance.

Still another object of this invention is to provide a new and improved reversible food processing tool for performing a variety of food processing operations and which is less expensive and more efficient than providing individual rotary food processing tools for preforming these various operations and which is easier to store and to handle than a plurality of rotary processing tools which would be required to perform the same variety of food processing operations.

A further object of this invention is to provide a new and improved invertible/reversible food processing tool which will perform a wide variety of food processing tasks when mounted in various ways to the same motor drive.

In carrying out this invention in one illustrative embodiment thereof, an invertible/reversible tool is provided for use in a rotary food processing appliance having a working bowl with a bottom and side wall for holding food items to be processed and having a motor-driven drive means extending into the bowl for rotating the tool about a vertical axis in the bowl. The food processing tool has an elongated upright hub adapted to be rotated about a vertical axis by the drive means for performing predetermined processing operations in a first position and other predetermined food processing operations in a second upside down position. The elongated upright hub has first and second coupling means on opposite ends thereof each of which is adapted to engage the drive means in driven relationship for rotating the upright hub about the vertical axis in a first direction when the first coupling means is engaged and in a second direction when said second coupling means is engaged with the drive means. Keyway means are provided extending vertically along at least more than half the length of the upright hub, and a blade hub is slidably mounted on the hub and is keyed to the upright hub by the keyway means for providing a positive driving relation between the upright hub and the blade hub. Reversible blades extending outwardly relative to the axis of rotation from opposite sides of the hub are provided each having a first edge and a second edge with the blades being mounted on the hub such that the first edges rotate in the same direction and forwardly contact food to be processed in the bowl when the upright hub is rotated by said first coupling means in said first direction with said blade hub positioned near the bottom of said upright hub. The second edges of said blades rotate in the same direction and forwardly contact food to be processed, when said upright hub is turned upside down with said second coupling means engaging said drive means and with said hub positioned near the lower end of the inverted upright hub, whereby predetermined food processing operations are performed by the same tool in a first position using the first edges of said blades on said tool, while different food processing operations can be performed by turning the tool upside down and using the second edges of said blades for performing different food processing operations.

Accordingly, the blade of an invertible/reversible food processing tool can be operated when drive-connected in a first position in the bowl to perform one type of food processing operation and can be reversed for exposing a different portion of the blade or tool to the food being processed for performing different food processing operations when drive-connected in a second position within the bowl.

BRIEF DESCRIPTION OF THE DRAWINGS

The invention, together with further objects, aspects, features and advantages thereof may be more fully understood from the following description considered in conjunction with the accompanying drawings.

DESCRIPTION OF THE PREFERRED EMBODIMENTS

Figure 1:
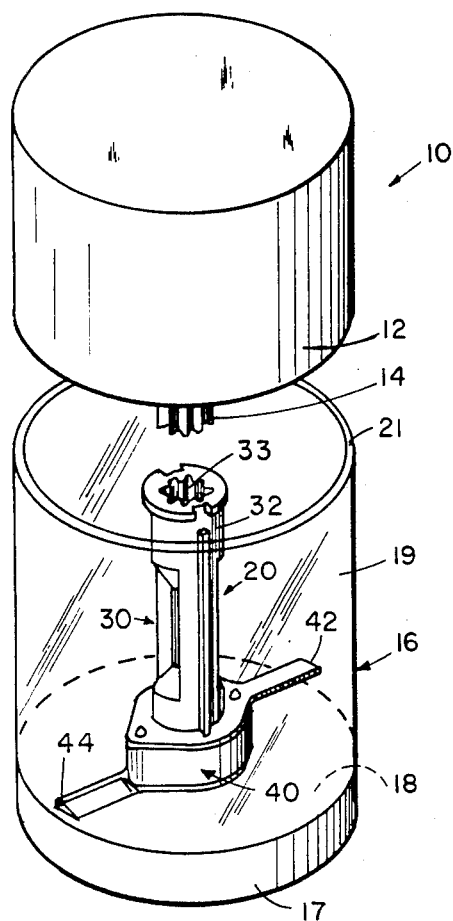
FIG. 1 is a perspective view showing the reversible food processing tool in accordance with the present invention mounted in the bowl of a food processing appliance having a top housing containing the motor drive with downwardly extending drive means. The top housing is illustrated removed upwardly a distance from the rim of the bowl on which it is adapted to be operatively positioned during use.

Referring now to FIG. 1, a compact food processing appliance referred to generally with the reference numeral 10 comprises a top housing 12 which contains an electric motor drive (not shown) having an octagonal star-shaped drive unit 14 extending downwardly from the top housing 12. This drive unit 14 is driven by the motor drive in the housing 12. There is a work bowl 16 having a bottom 18 and a cylindrical side wall 19 for holding food items to be processed by the appliance 10. An invertible/reversible food processing tool, referred to generally with the reference 20, is adapted to be mounted in the bowl 16 to be rotated in the bowl by the drive unit 14.

Figure 2:
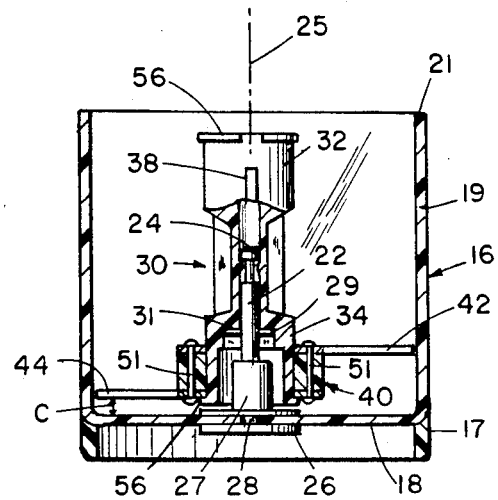
FIG. 2 is a side elevational sectional view of the bowl and tool structures shown in FIG. 1 for further illustrating the reversible food processing tool mounted in the bowl.

As will best be seen in FIG. 2, the bowl 16 is terminated in an annular skirt 17 by which the bowl 16 is supported on a kitchen counter in operating position. An electrical cord with an electric plug on the end (not shown) is used to energize the motor drive within the housing 12 when this housing is appropriately mounted on the rim 21 of the bowl 16. An upstanding rotatable guide shaft or post 22 is vertically mounted centrally on the bottom 18 of the bowl 16 by means of a sealed bearing unit 27 which is anchored to the bottom 18 by a bottom plate 26 and a stud 28.

The purpose of the upstanding rotatable guide shaft 22 which extends upwardly along the axis of rotation 25 of the reversible rotary tool 20 is to act as a tool arbor and support which maintains the reversible food processing tool 20 in an upright position while the tool rotates around the axis of rotation 25. Also, this rotatable shaft 22 has a knob 24 at its upper end which acts as a detent, to be explained later, over which an elongated upright hub 30 of the tool 20 is snapped downwardly into operating position for holding the elongated hub down. This rotatable shaft 22 also includes a transverse pin 29 which establishes the vertical position of the elongated hub 30 on the shaft. This transverse pin 29 is received (as shown in FIG. 2) into a transverse slot 31 at the upper end of the socket recess of the elongated hub as will be explained in greater detail later.

Figure 3:
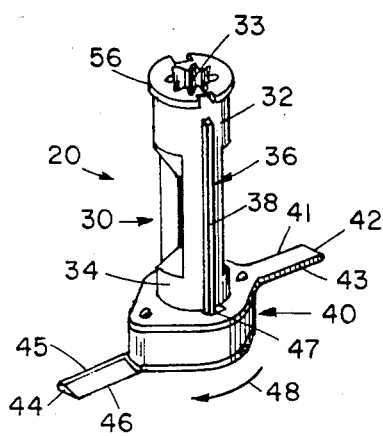
FIG. 3 is a perspective view of the reversible food processing tool of the present invention illustrated with the blade hub of the tool positioned on the elongated upright hub of the tool in a first location for rotation which faces forwardly first blade edges which rotate in the same direction.
Figure 4:
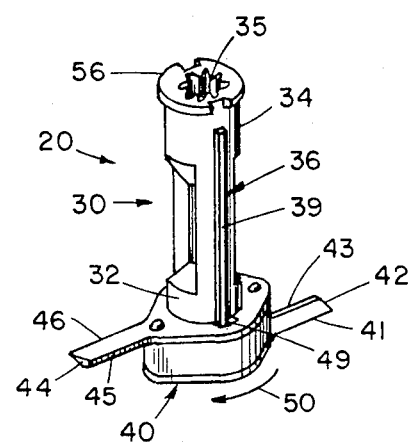
FIG. 4 is a perspective view similar to FIG. 3 illustrating the reversible tool of FIG. 3 turned upside down with the blade hub slid down to the lower end of the elongated upright hub of the reversible tool with the second blades edges now facing forwardly and rotating in the same direction.

Referring now to FIGS. 3 and 4, the reversible rotary food processing tool 20 has the elongated upright hub 30 which is adapted to be rotated together with the vertical shaft 22 by the drive unit 14. This elongated upright hub 30 is intended to be coupled in driven relationship to the drive unit 14 by a first coupling means in the form of a socket 32 on one end of this elongated upright hub and by a second coupling means in the form of a second socket 34 on the other end of this elongated hub 30. The sockets 32 and 34 have identical configurations in the form of octagonal star-shaped end socket recesses 33 and 35, respectively, which openings are adapted to mate with the octagonal star-shaped configuration of the motor drive unit 14 which removably fits into either of the sockets 32 and 34 and thereby drives the elongated upright hub 30. This star-shaped drive member 14 is preferrably rubber coated for quieter operation. The elongated upright hub 30 includes keyway means 36 in the form of a pair of parallel, symmetrically located, axially extending, ridges or splines 38 and 39 protruding outwardly from diametrically opposed sides of the elongated upright hub 30. These ridges 38 and 39 each extend in length for a major portion of the full length of the elongated upright hub 30.

An encircling annular blade hub 40 is slidably mounted on the elongated upright hub 30 and is keyed to this elongated upright hub by the keyway means 36 for providing a positive driving relationship between the elongated upright hub and the encircling blade hub. For keying this generally annular hub 40 to the pair of ridges or splines 38 and 39, this annular hub has a pair of parallel, diametrically opposed axially-extending grooves 47 and 49, respectively which are freely axially slidable along the splines 38 and 39. Invertible/reversible blades 42 and 44 are rigidly mounted by rivets 51 onto the top and bottom of the annular blade hub 40 as is illustrated in FIG. 2. The upper blade 42 has a blunt leading edge 43 (FIG. 3) and a sharp trailing edge 41, and the lower blade 44 also has a blunt leading edge 45 and a sharp trailing edge 46 as illustrated in FIG. 3 when the elongated upright hub 30 is oriented with the first socket 32 at its upper end, as shown in FIGS. 2 and 3. It is to be noted from FIGS. 1 and 2 that when the first socket 32 is uppermost with its opening 33 in position to be coupled to the drive unit 14, the other end opening 35 in the second socket 34 is facing downwardly to receive the transverse pin 29 therein for supporting the whole tool 20 for rotation with the guide shaft 22 in the direction of arrow 48. The bearing unit 27 is received within the downwardly facing socket recess as shown in FIG. 2.

When the invertible/reversible food processing tool 20 is turned upside down, as shown in FIG. 4, with the first socket 32 now being positioned at the lower end such that its end opening 33 now faces downwardly to fit over the bearing unit 27 (FIG. 2), the annular blade hub 40 will freely slide down along the elongated upright hub 30 and be positioned such that in the direction of the rotation of the arrow 50 in FIG. 4, the leading edges 41 and 46 of the blades 42 and 44 will be rotating in the same direction with their forward sharp edges 41 and 46 now contacting the food to be processed, which is just the opposite of what occured in FIG. 3, where the blunt edges were forwardly contacting the food to be processed. As will be seen in FIG. 2, the transverse pin 29 positioned transversely to the rotational axis 25 of that shaft 22 fits into a transverse slot 31 and limits the downward movement of the elongated hub 30 along the shaft 22 in order to provide a clearance indicated at C between the bottom blade on the tool 20 and the horizontal bottom 18 of the bow being about ⅛ inch clearance.

Figure 5:
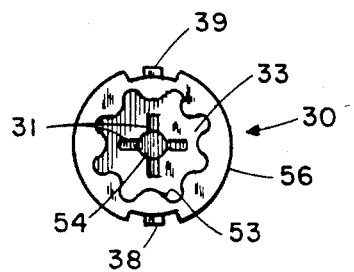
FIG. 5 is an enlarged view looking in an axial direction into the interior of one of the sockets on the end of the elongated hub.

FIG. 5 is an enlarged view looking in an axial direction into one of the two identical socket recesses 33 or 35 on the ends of the elongated hub 30, for example into the recess 33. The octagonal star-shaped configuration 53 of the wall of the recess 33 is clearly seen. There is a central axial opening 54 which fits snuggly onto but slides freely along the rotatable shaft 22 (FIG. 2) when this elongated hub 30 is being slid downwardly along this shaft 22. Extending transversely are a pair of slots or grooves 31 which are at right angles to each other and which radiate from the central opening 54. These grooves 31 are about ⅛ of an inch deep in the axial direction and either of these grooves will fit snuggly onto the transverse support pin 29 as shown in FIG. 2. By virtue of having two such slots or grooves 31 the user more readily can align the transverse pin 29 with one of these grooves 31 when sliding the elongated hub 30 down fully onto the shaft 22 with the pin 29 seated into one of these grooves as shown in FIG. 2.

Figure 6:
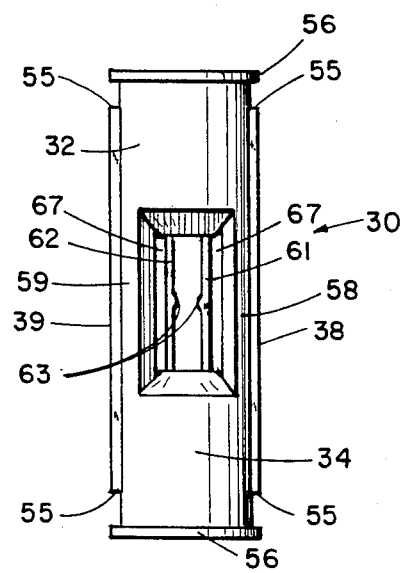
FIG. 6 is an enlarged elevational sectional view of the elongated hub showing the means by which this hub snaps in detent fashion onto the knob at the upper end of the rotatable guide shaft or guide post.

The elevational view in FIG. 6 shows the elongated hub 30 with the encircling blade hub 40 shown removed for clarity of illustration. The socket 32 is shown upward facing and the socket 34 downward facing. The pair of splines or ridges 38 and 39 terminate 3/16th of an inch short of the respective ends of the elongated hub 30 for providing abrupt shoulders 55 whose purpose will be explained later.

In order to provide a detent snap-on action with respect to the knob 24 (FIG. 2), the elongated hub 30 is constructed with a pair of spaced parallel leg portions 58 and 59 which rigidly interconnect the two socket portions 32 and 34, and then there are a pair of more closely spaced parallel, stiffly flexible strips 61 and 62 which extend between the socket portions 32 and 34. These strips 61 and 62 have a pair of inwardly facing opposed detent bumps 63 at their centers. When the elongated hub 30 is slid down onto the rotatable shaft 22, the knob 24 passes between these detent bumps 63 with a snap-on action. There are elongated openings or windows 67 between the legs 58 and 59 and the neighboring strips 61 and 62. Thus, sufficient resiliency is in the strips 61, 62 for allowing them to spread apart slightly for enabling the rounded knob 24 to pass upwardly between these detent bumps 63. Thus, the elongated hub 30 during operation is held captured by the knob 24 which is now above the detent bumps 63 and by the transverse pin 27 which is now seated up in one of the grooves 31 (FIG. 5). Consequently, the elongated hub 30 cannot move upwardly or downwardly significantly relative to the rotatable shaft 22 during operation.

Figure 7:
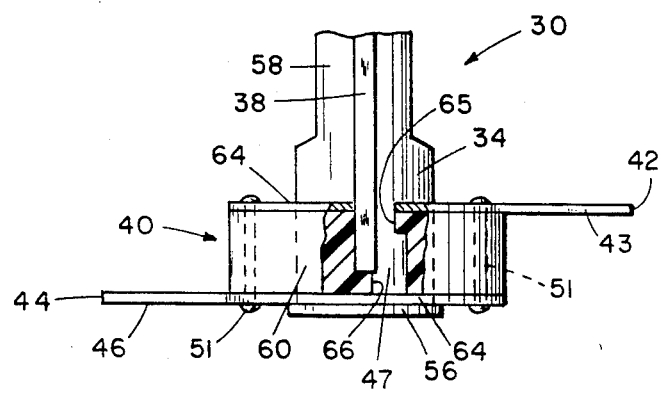
FIG. 7 is an enlarged elevational sectional view of a portion of the blade hub with the elongated hub for showing how the blade hub locks into its position at the lower end of the elongated hub, regardless of which end of the elongated hub is downward.

In order to explain how the annular blade hub 40 is locked in its operating position at the lower end of the elongated upright hub 30, attention is invited to FIG. 7. The annular blade hub 40 includes a tough rigid plastic body 60 which is sandwiched between the ring portions 64 of the two blades 42 and 44. These ring portions 64 encircle the socket portion 34 of the elongated hub 30, and the rivets 51 pass through these ring portions 64 and through the tough rigid plastic body 60 of the blade hub 40. The axially extending groove or channel 47 which can slide axially along the spline 38 has a pair of lips 65 and 66 projecting inwardly from its opposite sides at its upper and lower ends. The other groove 49 (FIG. 4) has a similar pair of lips not seen. In FIG. 7, the lip 66 is caught beneath the shoulder 55 (FIG. 6) at the lower end of the spline 38, due to the rotation 48 (FIG. 3) of the driven inner elongated hub 30, thereby now preventing the blade hub 40 from sliding upwardly along the elongated hub 30. A flange 56 at each end of the elongated hub 30 captures the blade hub 40. The other lip 65 similarly becomes caught beneath the shoulder 55 at the socket 32 end of the spline 38, when the elongated hub 30 is inverted as shown FIG. 4 with the socket 32 down and is driven in the direction of the arrow 50 with the annular blade hub 40 now at the new lower end encircling the socket 32.

The operation of the appliance 10 is very convenient. The work bowl 16 is placed on a counter or other flat, firm surface, and the reversible rotary food processing tool 20 is first set by the desires of the users by sliding the blade hub 40 along the upright hub 30 to select whether the leading sharp edges 41 and 46 are to be used, as illustrated in FIG. 4, or whether a reversal is to be made and the blunt edges 43 and 45 of the blades 42 and 44 respectively, are selected as illustrated in FIG. 3. The sockets 32 and 34 may be color coded, for example, one white and one dark so that the edge positioning of the blades 42 and 44 may readily be selected quickly by a color code. For example, socket 32 may be white, and when it is mounted down on the shaft 22 the leading sharp edges of the blades 42 and 44 have been selected for performing the food processing operations (FIG. 4). The sharp edges are useful for chopping most soft foods which can be easily pierced with a knife, for example, onions, garlic, shallots, fresh herbs, butter and roots like ginger and horseradish. By simply turning the reversible tool upside down and thereby exposing the blunt edges 43 and 45 of the blade 42 as illustrated in FIG. 3, a totally different type of food processing may be accomplished by using the blunt edges for grinding, grating and pureeing, for example, such food items as coffee, spices, hard cheeses, chocolate, nuts and pureeing cooked vegetables and ripe fruit for baby food. Once the blade hub is properly positioned for the food processing operation which is desired to be performed, the elongated upright hub with the blade hub positioned on the lower end thereof, may be slightly twisted counterclockwise relative to the blade hub to lock it in position, at which time elongated upright hub 30 with the blade hub 40 down is inserted into the work bowl on the shaft 22 and slid over the transverse pin 29 while the knob 24 will snap into position above the detents 63 (FIG. 6). The food to be processed is then put into the working bowl with the thumb or a finger covering the recess 33 or 35 of the socket 32 or 34, respectively depending on which end of the reversible tool is upward to prevent small pieces of food from entering the socket. The motor housing 12 is then placed over the work bowl 16 and the motor drive unit 14 is inserted into the upper socket 32 or 34 and the electric plug (not shown) is plugged into an electric outlet. The bowl 16 is then gripped with one hand, while the other hand is used to press down firmly on the motor housing to turn on the motor by a switch actuator in the motor housing 12 (not shown) engaging the rim 21. To turn the motor off, the pressure is released, and then the housing 12 is lifted from the bowl 16 after tool rotation has stopped. The upright hub 30 is then removed by pulling straight up on this hub 30, thus removing the whole reversible tool 20 from the bowl.

The reversible tool in accordance with this invention accordingly provides a multiplicity of food processing functions by operating the tool in a first position using sharp edges of the blades on the tool while different food processing operations can be performed by turning the tool upside down and using the blunt edges of the very same blades for performing different food processing operations.

Since other changes and modifications varied to fit particular operating requirements and environments will be apparent to those skilled in the art, the invention is not considered limited to the examples chosen for purposes of illustration, and includes all changes and modifications which do not constitute a departure from the true spirit and scope of this invention as claimed in the following claims.

What is claimed is:

1. A reversible food processing tool for use in a rotary food processor having a working bowl with a bottom and sidewall for holding the food items to be processed and having motor-driven drive means for rotating the tool about a vertical axis in the bowl, said reversible food processing tool performing predetermined processing operations in a first position and other predetermined operations in a second upside-down position comprising:

an elongated hub adapted to be rotated about said vertical axis by said drive means, first and second coupling means on opposite ends of said elongated hub adapted to engage said drive means in driven relationship for rotating said elongated hub about said vertical axis, said elongated hub being rotated in a first direction when said first coupling means is engaged with said drive means and said elongated hub being rotated in a second direction when said elongated hub is upside down and said second coupling means is engaged with said drive means, keyway means extending vertically along at least more than half of the length of said elongated hub, a blade hub slidingly mounted on said elongated hub and being keyed to said elongated hub by said keyway means for providing a positive driving relationship between said elongated hub and said blade hub, reversible blades extending outwardly relative to said axis from opposite sides of said blade hub, each of said blades having a first edge and a second edge, said blades being mounted on said blade hub such that the first edges rotate in the same direction and forwardly contact food to be processed in said bowl when said elongated hub is rotated by said first coupling means in said first direction with said blade hub positioned near the bottom of said elongated hub, said second edges rotating in the same direction and forwardly contacting food to be processed when said elongated hub is turned upside down with said second coupling means engaging said drive means and with said blade hub positioned near the bottom of said elongated hub, whereby different food processing operations are performed by the same tool in a first position using the first edges of said blades on said tool while different food processing operations can be performed by turning the tool upside down and using the second edges of said blades for performing different food processing operations.

2. The reversible food processing tool as claimed in claim 1, wherein said first and second coupling means comprise sockets.

3. The reversible food processing tool as claimed in claim 2, wherein said sockets are identical in shape and configuration and each is adapted to engage said drive means in the same drive relationship.

4. The reversible food processing tool as claimed in claim 1, wherein said first edge of said blades is a sharp edge and second second edge of said blades is a blunt edge.

5. The reversible food processing tool as claimed in claim 1, wherein said keyway means comprise a pair of symmetrical raised ridges protruding outwardly from diametrically opposite sides of said elongated hub having said blade hub slidably mounted for up and down movement along said raised ridges of said elongated hub, said blade hub being generally annular in configuration and encircling said elongated hub.

6. The reversible food processing tool as claimed in claim 5, in which: said raised ridges terminate a predetermined distance from each end of the elongated hub for forming abrupt shoulders at opposite ends of said ridges, and said annular blade hub has lip means which become caught beneath one of said abrupt shoulders when said blade hub is positioned at the lower end of said elongated hub and said drive means rotates said elongated hub, regardless of which end of said elongated hub is oriented down.

7. The reversible food processing tool as claimed in claim 1 in which: said working bowl has a rotatable shaft extending vertically in the center of said bowl, said shaft has upper and lower ends, said shaft has transversely extending support means thereon near its lower end and said shaft has a knob on its upper end, said elongated hub is slidable downwardly onto said shaft and has detent means engaging below said knob upon sliding said elongated hub down onto said shaft for preventing said elongated hub from rising upwardly along said shaft during rotation and said transversely extending support means is engaged with whichever of said first and second coupling means is oriented downwardly for preventing said elongated hub from moving downwardly along said shaft during rotation.

8. The reversible food processing tool as claimed in claim 7 in which: said elongated hub has a pair of spaced parallel stiffly flexible strips extending longitudinally therein, said strips straddle said rotatable shaft upon sliding said elongated hub down onto said shaft, and said strips have a pair of opposed inwardly facing detent bumps which snap into position below said knob.

9. The reversible food processing tool as claimed in claim 8, wherein said keyway means comprise a pair of symmetrical raised ridges protruding outwardly from diametrically opposite sides of said elongated hub having said blade hub slidably mounted for up and down movement along said raised ridges of said elongated hub, said blade hub being generally annular in configuration and encircling said elongated hub.

10. The reversible food processing tool as claimed in claim 9, in which: said raised ridges terminate a predetermined distance from each end of the elongated hub for forming abrupt shoulders at opposite ends of said ridges, and said annular blade hub has lip means which become caught beneath one of said abrupt shoulders when said blade hub is positioned at the lower end of said elongated hub and said drive means rotates said elongated hub, regardless of which end of said elongated hub is oriented down.

11. Reversible food processing tool apparatus for use in a rotary food processing appliance having a working bowl with a bottom and sidewall for holding the food items to be processed and having motor-driven drive member for rotating the tool about a vertical axis in the bowl, said reversible food processing tool performing predetermined processing operations in a first position and other predetermined operations in a second upside-down position comprising:

an elongated hub adapted to be rotated about said vertical axis by said drive means, first and second couplings at opposite ends of said elongated hub adapted to engage said drive member in driven relationship for rotating said elongated hub about said vertical axis, said elongated hub being rotated in a first direction when said first coupling is engaged with said drive member and said elongated hub being rotated in a second direction when said elongated hub is upside down and said second coupling is engaged with said drive member, said elongated hub including a pair of parallel legs extending between and rigidly interconnecting said couplings for holding said couplings spaced apart in axial alignment, said elongated hub also including at least one stiffly flexible detent element extending between said couplings, keyway means extending vertically along each of said legs on the exterior thereof, an annular blade hub encircling said elongated hub and being freely axially slidable along said elongated hub, said blade hub being keyed to said elongated hub for providing a positive driving relationship between said hub and said blade hub, at least two blades extending outwardly relative to said axis from opposite sides of said blade hub, each of said blades having a first edge and a second edge, said blades being mounted on said blade hub such that the first edges rotate in the same direction and forwardly contact food to be processed in said bowl when said elongated hub is rotated by said first coupling in said first direction with said blade hub positioned near the lower end of said elongated hub, said second edges rotating in the same direction and forwardly contacting food to be processed when said elongaged hub is turned upside down with said second coupling engaging said drive member and with said blade hub positioned near the now lower end of said elongated hub, said bowl including a vertical shaft concentric with said axis having detent means associated therewith, and said elongated hub being manually slidable onto said shaft with said detent element cooperating with said detent means for manually removably retaining said elongaged hub in operating position on said shaft during rotation by said drive member, whereby food processing operations are performed by the tool in a first position using the first edges of said blades while other food processing operations can be performed by turning the elongated hub upside down and using the second edges of said blades.

* * * * *